Dec. 2, 1958 W. C. MAESER ET AL 2,863,141

TRANSMISSION SYSTEM OUTAGE LOCATOR

Filed Dec. 26, 1956 2 Sheets-Sheet 1

INVENTORS
WILLIAM C. MAESER,
JOHN E. McADAM,
BY
McMorrow, Berman + Davidson
ATTORNEYS.

TRANSMISSION SYSTEM OUTAGE LOCATOR

Filed Dec. 26, 1956 2 Sheets-Sheet 2

INVENTORS
WILLIAM C. MAESER,
JOHN E. McADAM,
BY
McMorrow, Berman + Davidson
ATTORNEYS.

United States Patent Office 2,863,141

Patented Dec. 2, 1958

2,863,141

TRANSMISSION SYSTEM OUTAGE LOCATOR

William C. Maeser and John E. McAdam, Baton Rouge, La., assignors, by mesne assignments, to Lotran Incorporated, Baton Rouge, La., a corporation of Delaware Application December 26, 1956, Serial No. 630,597

5 Claims. (Cl. 340—253)

This invention relates to power transmission systems, and more particularly to apparatus for automatically locating line outages in a system without requiring subscriber participation.

The main object of the invention is to provide a novel and improved outage location apparatus for a power transmission system, said apparatus being relatively simple in construction, being operative automatically in response to the tripping of an associated circuit breaker, and providing a distinctive signal whereby the tripped circuit breaker may be readily identified at the central office of the system so that service personnel may be dispatched directly to the branch line containing the tripped circuit breaker.

A further object of the invention is to provide an improved outage locating apparatus in a power transmission system having a plurality of branch lines, the apparatus providing a distinctive radio signal at the location where line trouble occurs, whereby the central office of the system receives said distinctive radio signal and is enabled to immediately dispatch service personnel to the location from which the signal originates without the necessity of checking any other branch lines of the system.

A still further object of the invention is to provide an improved supervisory signal system for a power transmission organization of the type having a plurality of branch lines, each provided with a circuit breaker, the improved system being arranged so that a distinctive signal is given automatically when any of the circuit breakers trips, the signal being received at the central office and thereby providing an immediate indication of the branch line which is defective, whereby service personnel may be immediately dispatched to said branch line.

A still further object of the invention is to provide an improved outage locating system for a power transmission organization of the type having a large number of branch lines, each protected by an individual circuit breaker, the improved system being arranged to provide a distinctive signal responsive to the tripping of any of the circuit breakers, the signal identifying the faulty branch line, whereby the signal, when received at a central office, provides immediate information enabling service personnel to be dispatched to the branch line, and the arrangement being such that the transmitter providing the signal is energized from the main power line of the transmission system, independently of the defective branch line, so that the transmitter will operate immediately as soon as the associated circuit breaker trips.

A still further object of the invention is to provide an improved outage locator for a power transmission system having a large number of branch lines which may be located at relatively remote points from the central office of the system, the central office being located at any desirable position not necessarily connected to the lines of the transmission system, and the outage locator being provided with means to generate distinctive radio signals responsive to the tripping of any of the circuit breakers of the system, the signals being sustained for timed periods, whereby confusion due to a multiplicity of signals transmitted at the same time is substantially avoided.

Further objects and advantages of the invention will become apparent from the following description and claims, and from the accompanying drawings, wherein:

The outage locating system of the present invention is primarily intended for use by public service companies to determine immediately the location of any electrical line outage without requiring participation of the subscribers employing the defective branch of the transmission system.

The system of the present invention employs respective radio transmitters which are coupled to the reclosing trip arms, or to other trip-responsive moving parts of the circuit breakers employed to protect and localize power line faults, for example, short circuits, or the like. In accordance with this invention, when a circuit breaker is tripped, the moving element associated therewith closes a switch which energizes the associated radio transmitter and the modulating means thereof, whereby a radio signal is immediately broadcast. A radio receiver at the central office of the system or at any other suitable location picks up the radio signal and from the distinctive modulation thereof immediately identifies the transmitter and hence the circuit breaker which has tripped. The location or the number of the tripped circuit breaker may be then relayed in any suitable manner, for example, by two-way radio from the central office to a maintenance truck nearest the defective branch line, so that service personnel will be enabled to proceed directly to the location of the trouble and remedy the same without requiring any participation by the subscribers served by the defective branch line.

Figures 6, 7, 8, 9, 10:
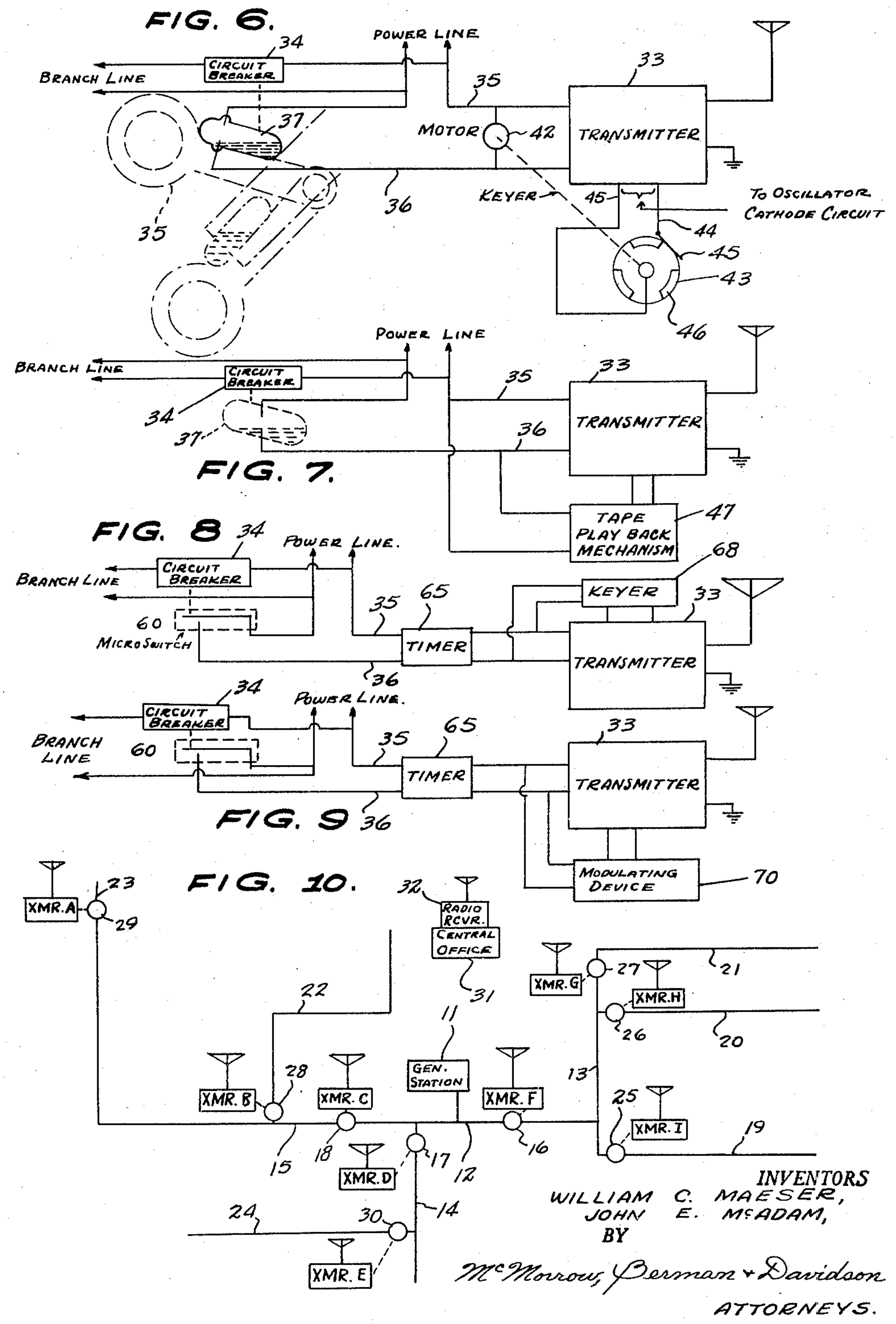
Figure 6 is a block diagram showing the electrical components of an identification transmitter and associated parts, employed with one of the circuit breakers in a power transmission system equipped with outage locating means according to the present invention.
Figure 7 is a block diagram similar to Figure 6 but showing a modification of the system wherein the transmitter is modulated by a tape play-back mechanism.
Figure 8 is a block diagram similar to Figure 6 but showing a further modification wherein a timing means is employed to limit the period of operation of the identification transmitter.
Figure 9 is a block diagram similar to Figure 8 but illustrating in more general form the electrical components of a timed identification transmitter operated automatically responsive to the tripping of the circuit breaker of a branch line.
Figure 10 is a schematic diagram illustrating a typical transmission system layout and showing the manner in which the various circuit breakers in such a typical transmission system are provided with respective identification radio transmitters and the central office of the system is provided with a radio receiver adapted to receive the distinctive signals from the respective transmitters.

Referring now to the drawings, and more particularly to Figure 10, a typical power transmission system is diagrammatically illustrated, the system comprising, for example, a generating station 11 which is connected to a main power line 12. The power line 12 feeds respective branch lines, for example, the branch lines 13, 14 and 15, said branch lines being protected by respective circuit breakers 16, 17 and 18. Additional distribution lines may be energized by the branch lines 13, 14 and 15, for example, the branch line 13 may be connected to sub branch lines 19, 20 and 21, the branch line 15 may be connected to sub branch lines 22 and 23, and the branch line 14 may be connected to sub branch lines, one of the same being shown at 24. In the typical system illustrated in Figure 10, the sub branch lines 19, 20 and 21 are protected by circuit breakers shown respectively at 25, 26 and 27, the sub branch lines 22 and 23 are provided with circuit breakers shown respectively at 28 and 29, and the sub branch line 24 is provided with a circuit breaker shown at 30.

As will be readily understood, the respective sub branch lines may be distributed over a wide area and may be located considerable distances from each other. For servicing the respective portions of the power transmission system, maintenance crews may be provided in trucks having two-way radio communication equipment, so that in the event of a defective branch line or sub branch line, the most closely adjacent maintenance truck to the defective section may be notified and may be instructed to repair the defective section. The system is provided with a central office 31 which is the headquarters of the maintenance dispatcher, said central office being provided with the radio equipment required for communication with the maintenance trucks. The central office 31 is also provided with a radio receiver 32 which is continuously energized and which is tuned to receive a definite signal frequency, said frequency being that emitted by the respective identification transmitters associated with the circuit breakers of the transmission system.

As is clearly illustrated in Figure 10, each circuit breaker has associated therewith an identification transmitter, each transmitter having means to modulate the same in a distinctive manner so that when the signal therefrom is received in the central office by the radio receiver 32, the associated circuit breaker may be readily identified and located.

Figure 1:
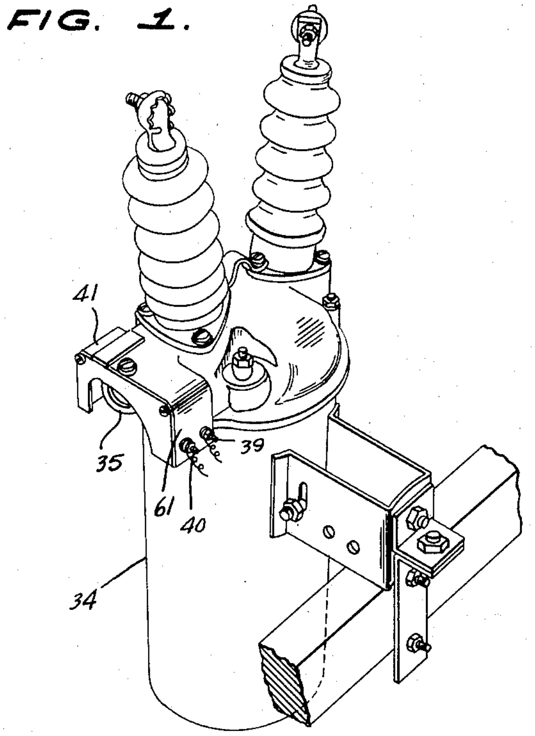
Figure 1 is a perspective view of a typical branch line circuit breaker provided with switch means operated in response to the opening of the circuit breaker to energize an associated radio transmitter, in accordance with the present invention.

Figure 6 diagrammatically illustrates one arrangement according to the present invention for automatically initiating a distinctive coded radio signal responsive to the tripping of an associated circuit breaker. Thus, the arrangement illustrated in Figure 6 comprises a radio transmitter 33 adapted to broadcast a radio signal on a definite frequency, namely, the frequency to which the radio receiver 32 is tuned, the transmitter 33 being connected to the power lines on the line side of the associated circuit breaker 34, as shown, through respective supply wires 35 and 36. Connected in the supply wire 36 is a normally open mercury switch 37 which is mechanically coupled to a moving part of the associated circuit breaker 34 in a manner to close responsive to the tripping of the circuit breaker. Thus, when the circuit breaker is of the conventional type illustrated in Figures 1, 2 and 3, namely of the type provided with a normally elevated pivoted reclosing arm 35 which rotates downwardly when the circuit breaker is tripped, the mercury switch 37 may be mounted directly on the arm 35. When the arm 35 is in its horizontal position, shown in full line view in Figures 1 and 2, the mercury switch 37 is opened. When the circuit breaker is tripped, as the result of a serious short circuit, or other serious fault in the associated line, the arm 35 rotates downwardly to the inclined position thereof shown in dotted view in Figure 2, allowing the mercury in the switch 37 to close the switch contacts.

The terminals of the mercury switch 37 are connected through respective terminals 39 and 40 mounted on an end wall of the recloser arm housing 41, in series with the transmitter supply wire 36, whereby the transmitter 33 becomes energized from the power line.

Connected across the wires 35 and 36 is the drive motor 42 of a keying device, for example, a commutator drum 43, the drum being coupled to the motor 42 and being rotated thereby. Connected in the oscillator cathode circuit of the transmitter 33 are the respective wires 44 and 45, one of the wires being connected to the disc 43 and the other wire being connected to a brush 45 engaging the periphery of the disc. The disc is provided with spaced peripheral insulating segments 46, the segments 46 alternately engaging the brush 45 to thus intermittently interrupt the cathode circuit of the oscillator, providing keyed transmission.

Each of the respective transmitters of the power transmission system is provided with a coding disc 43 having a distinctive arrangement pattern of its insulating peripheral sections 46, so that each transmitter is keyed in a distinctive manner when transmission is initiated by the tripping of its associated circuit breaker.

In the modification illustrated in Figure 7, the transmitter 33 is modulated in a conventional manner by a memory device 47, comprising a magnetic tape playback mechanism, which is used instead of the coding disc arrangement of Figure 6. Thus, the playback mechanism 47 is energized simultaneously with the transmitter 33, being connected across the lines 35 and 36, responsive to the closure of the mercury switch 37 when the associated circuit breaker trips. The transmitter 33 may be thus modulated to provide a distinctive voice message giving the identification of the transmitter, the location of the associated circuit breaker, or other information necessary to accurately locate the defective portion of the transmission system.

Figure 4:
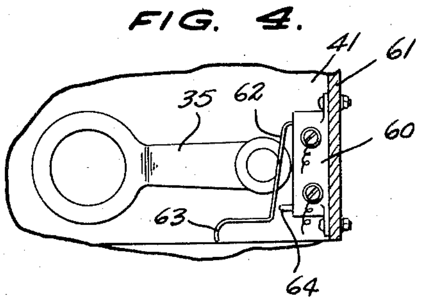
Figure 4 is an enlarged fragmentary transverse vertical cross sectional view taken through a portion of the trip arm housing of a circuit breaker similar to that shown in Figures 1, 2, and 3, but illustrating a modified form of automatically-closing switch controlled by the trip arm of the circuit breaker.
Figure 5:
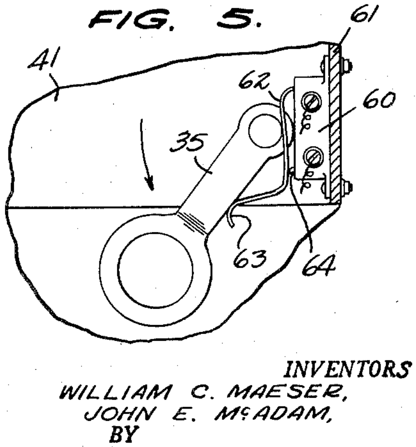
Figure 5 is a vertical cross sectional view similar to Figure 4 but showing the trip arm in its downwardly rotated position, assumed when the circuit breaker trips, and illustrating how the radio transmitter control switch associated therewith is closed by the downward movement of the trip arm.

Figures 4, 5, 8 and 9 illustrate a further modification of the outage locating system of the present invention. As shown in Figures 4 and 5, a micro switch 60 may be employed in place of the mercury switch 37, the micro switch 60 being mounted on any convenient portion of the circuit breaker adjacent the moving element thereof. For example, the micro switch 60 may be mounted on the end wall 61 of the recloser housing 41 adjacent the recloser arm 35, as shown. The micro switch 60 is provided with the actuating leaf spring 62 which extends adjacent the arm 35 and which is provided with an abutment end portion 63 normally located below the bottom edge of arm 35 and being engageable thereby when the arm rotates downwardly responsive to the tripping of the circuit breaker, as is illustrated in Figure 5. The micro switch spring 62 engages the switch plunger 64 when the micro switch is rotated counterclockwise, as viewed in Figure 4, to the position of Figure 5, thus closing the micro switch, and energizing the associated transmitter.

As shown in Figure 8, a conventional timer 65 is preferably connected between the supply wires 35, 36 and the transmitter 33, the timer being arranged to terminate transmission after a predetermined period, which may be of the order of five minutes, sufficient to identify the associated circuit breaker. The timer 65 is of any conventional type, for example, of the well-known Haydon type, which maintains its contacts closed for a predetermined period of time after initial energization thereof, and opens its contacts at the expiration of said predetermined time period. Thus, in the arrangement of Figure 8, when the micro switch 60 closes responsive to the tripping of the associated circuit breaker 34, the transmitter and the associated keyer, shown at 68, are connected through the timer 65 to the supply wires 35 and 36, whereby the transmitter begins its transmission, coded by the keyer 68, and continues same for a predetermined time period established by the setting of the timer 65. By providing a timer 65 with each of the transmitters of the power transmission system, the time of transmission of each transmitter is limited, so that in the event that a large number of transmitters are energized within a relatively short period of time, for example, due to a violent storm, hurricane, or similar abnormal condition causing a large number of line troubles, the dispatcher at the central office 31 will be able to systematically locate the various circuit breakers which have tripped and will be able to formulate an efficient scheme of repairing the various line defects at the different locations in the system. Since the various circuit breakers will not be tripped simultaneously but at slightly different times when such a situation develops, the transmission periods of the various transmitters will be spaced sufficiently for the dispatcher to individually identify the different transmitters set into operation.

Figure 9 more generally illustrates a system such as that shown in Figure 8 and described above, including a timer 65, and provided with a modulating device 70 which may be any suitable device adapted to modulate the transmitter 33 in a distinctive manner so as to provide identification of the transmitter when the signal therefrom is received by the radio receiver 32 in the central office 31. Thus, the modulating device 17 may comprise a tape play-back mechanism, such as is employed in the arrangement of Figure 7, a phonograph, a wire play-back mechanism, or any other well known modulation means.

Figure 2:
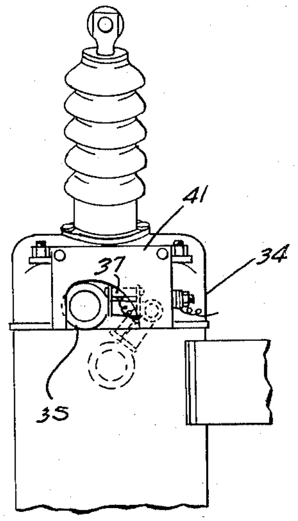
Figure 2 is a fragmentary side elevational view, showing the upper portion of the branch line circuit breaker of Figure 1 and illustrating the rotatable trip arm thereof which carries a normally open switch which closes in response to the tripping of the circuit breaker.
Figure 3:
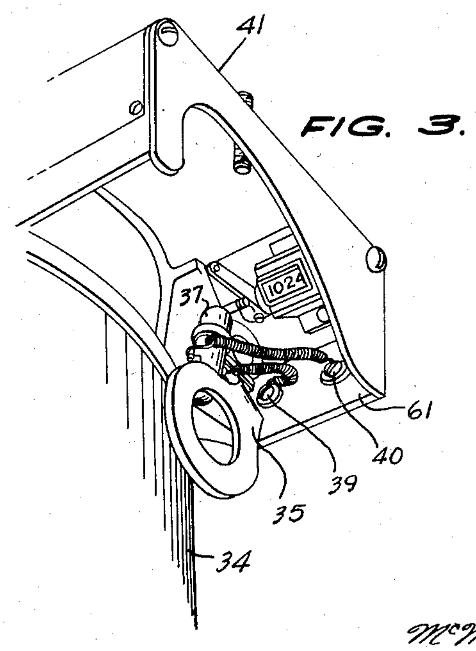
Figure 3 is an enlarged bottom perspective view of the trip arm housing and components contained therein, of the circuit breaker illustrated in Figures 1 and 2.

Although the embodiments illustrated in Figures 8 and 9 are illustrated as employing a micro switch 60 activated by the trip arm 35 of the circuit breaker, as specifically illustrated in Figures 4 and 5, it will be understood that a mercury switch, such as the mercury switch 37, may be employed in place thereof, the mercury switch being mounted on the arm 35, as illustrated specifically in Figures 2 and 3, or in any other part of the circuit breaker which rotates in response to the tripping of the circuit breaker.

While certain specific embodiments of an improved outage locating system for a power transmission organization have been disclosed in the foregoing description, it will be understood that various modifications within the spirit of the invention may occur to those skilled in the art. Therefore, it is intended that no limitations be placed on the invention except as defined by the scope of the appended claims.

What is claimed is:

1. For use in combination with a power transmission system including a plurality of branch lines and an overload circuit breaker in each line operable to open the line on overload and including a member automatically movable from a normal to an abnormal position when the circuit breaker is opened, apparatus for signalling the location of open branch lines including a plurality of radio transmitters each located adjacent one of said circuit breakers, each of said transmitters including a different distinctive signalling means operable to modulate the output of the transmitter when the transmitter is energized, an energizing circuit for each transmitter including a normally-open switch, said member of each circuit breaker being operable to close its adjacent normally-open switch when the member moves to its abnormal position, and a radio receiver positioned at a central location operable to receive radiation from each of said transmitters.

2. The apparatus of claim 1 in which said movable member of each of said circuit breakers is a pivoted reclosing arm.

3. The apparatus of claim 2 in which each of said switches is a micro-switch having an operating member positioned in the path of movement of its associated reclosing arm.

4. For use in combination with a power transmission system including a plurality of branch lines and an overload circuit breaker in each line operable to open the line on overload and including a pivoted reclosing arm automatically movable from an elevated normal position to a lower abnormal position when the circuit breaker is opened, apparatus for signalling the location of open branch lines including a plurality of radio transmitters operable to radiate the same frequency signal, each of said transmitters being located adjacent a different one of said circuit breakers and including a different code signal modulator, an energizing circuit for each transmitter including a normally-open switch having an operating member positioned in the path of movement of said reclosing arm to close said normally-open switch and complete the energizing circuit when the reclosing arm moves to its abnormal position, and a radio receiver at a central location tuned to the frequency of said transmitters.

5. The apparatus of claim 4 in which each of said code signal modulators includes means for modulating the transmitter frequency in accordance with a recorded signal.

References Cited in the file of this patent

UNITED STATES PATENTS

| | | |
|---|---|---|
| 1,849,870 | Fitzgerald | Mar. 15, 1932 |
| 2,538,135 | Turner | Jan. 16, 1951 |
| 2,719,284 | Roberts et al. | Sept. 27, 1955 |